(12) United States Patent
Wang et al.

(10) Patent No.: US 8,619,099 B2
(45) Date of Patent: Dec. 31, 2013

(54) DISPLAY DEVICE WITH ORIENTATION RECOGNITION UNIT

(75) Inventors: Wei Wang, Shenzhen (CN); De-Quan Mo, Shenzhen (CN); Qz-Feng Yang, Shenzhen (CN); Chang-Wei Lin, Shenzhen (CN)

(73) Assignees: Innocom Technology (Shenzhen) Co., Ltd., Shenzhen (CN); Chimei Innolux Corporation, Miaoli County (TW)

( * ) Notice: Subject to any disclaimer, the term of this patent is extended or adjusted under 35 U.S.C. 154(b) by 895 days.

(21) Appl. No.: 12/720,679

(22) Filed: Mar. 10, 2010

(65) Prior Publication Data

US 2010/0231608 A1    Sep. 16, 2010

(30) Foreign Application Priority Data

Mar. 11, 2009   (CN) .......................... 2009 1 0300797

(51) Int. Cl.
*G09G 5/20* (2006.01)
(52) U.S. Cl.
USPC ............................. 345/659; 345/649; 345/158
(58) Field of Classification Search
CPC .............................................. G09G 2340/0492
USPC .......................................... 345/659, 649, 158
See application file for complete search history.

(56) References Cited

U.S. PATENT DOCUMENTS

| | | | | |
|---|---|---|---|---|
| 5,146,231 A | * | 9/1992 | Ghaem et al. | 342/419 |
| 6,023,314 A | * | 2/2000 | Sumiyoshi | 349/96 |
| 6,573,970 B1 | * | 6/2003 | Saitoh et al. | 349/172 |
| 7,995,077 B2 | * | 8/2011 | Chang | 345/649 |
| 2005/0027167 A1 | * | 2/2005 | Chatenever et al. | 600/173 |
| 2007/0182713 A1 | * | 8/2007 | Kereth | 345/161 |
| 2010/0188634 A1 | * | 7/2010 | Konno et al. | 349/187 |

FOREIGN PATENT DOCUMENTS

| | | |
|---|---|---|
| CN | 1540410 A | 10/2004 |
| CN | 1769836 A | 5/2006 |
| CN | 2824214 Y | 10/2006 |

* cited by examiner

*Primary Examiner* — Javid A Amini
(74) *Attorney, Agent, or Firm* — WPAT, PC; Justin King (57) ABSTRACT

An exemplary display device includes a display panel, an orientation recognition unit and a directional detection circuit. The display panel is used to display images. The orientation recognition unit is used to determine an angle of rotation of the display panel and generates a corresponding direction detection signal. The directional detection circuit is used to adjust an orientation of one or more images displayed by the display panel according to the direction detection signal.

6 Claims, 9 Drawing Sheets

DISPLAY DEVICE WITH ORIENTATION RECOGNITION UNIT

BACKGROUND

1. Technical Field

The present disclosure generally relates to display technology, and particularly to a display device.

2. Description of Related Art

Conventionally, a desktop display device includes a display panel, a stand, and a hinge. The hinge connects the display panel and the stand. The display panel displays images. A length-to-width ratio of the images, commonly known as the aspect ratio of a screen of the display panel, can be varied by a user to a certain extent. The aspect ratio may for example be set at 4:3, 5:4, 16:9, etc, depending on the type of data displayed.

If an aspect ratio of 16:9 is set for the display, for example, if video is displayed, the viewed frame conforms accordingly. During review of many web pages or photos, particularly longer web pages and portrait-aspect images, a preferred aspect ratio is 9:16. Accordingly, display devices providing 90°, 180° or even 270° rotation of the display panel around the hinge have been developed.

However, when adjusting of the aspect ratio between a high ratio and a low ratio is desired, not only is rotation of the display panel around the hinge required, but also re-orientation of the displayed image itself must be executed by operation of a keyboard, mouse, or other input means to the host device's central processing unit (CPU). Thus, the task of adjusting the aspect ratio is somewhat complicated and inconvenient for a user.

What is called for, accordingly, is a display device which can overcome the described limitations.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION

Reference will now be made to the drawings to describe various embodiments in detail.

Figure 1:
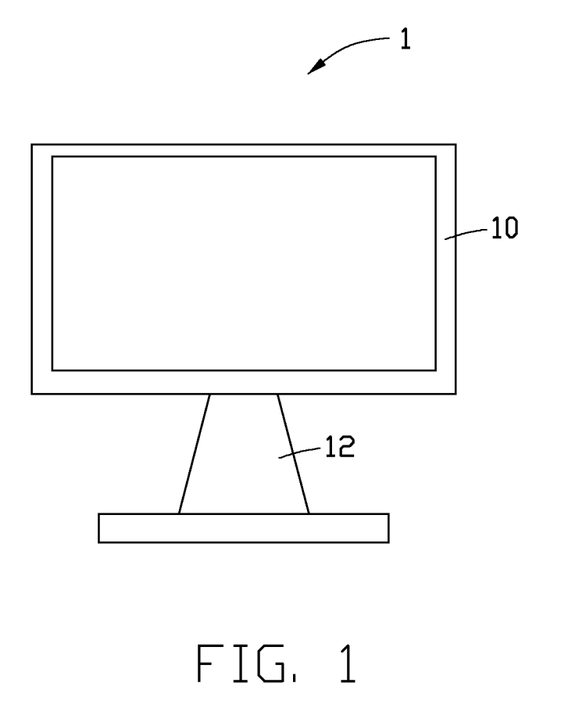
FIG. 1 is a front plan view of a first embodiment of a display device of the present disclosure, the display device including a display module.
Figure 2:
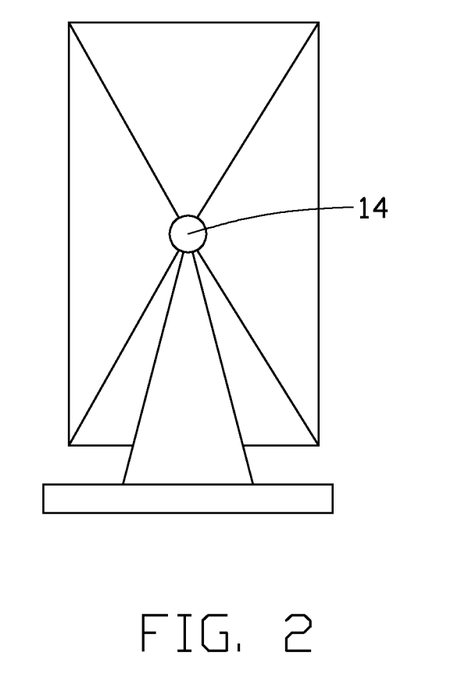
FIG. 2 is a rear plan view of the display device of FIG. 1, with the display module rotated 90° from its position shown in FIG. 1.

Referring to FIGS. 1-2, a first embodiment of a display device 1 of the present disclosure includes a display module 10, a stand 12, and a hinge 14. The display module 10 connects with the stand 12 via the hinge 14. The display module 10 can be rotated 90°, 180° or 270°, via the hinge 14.

Figure 3:
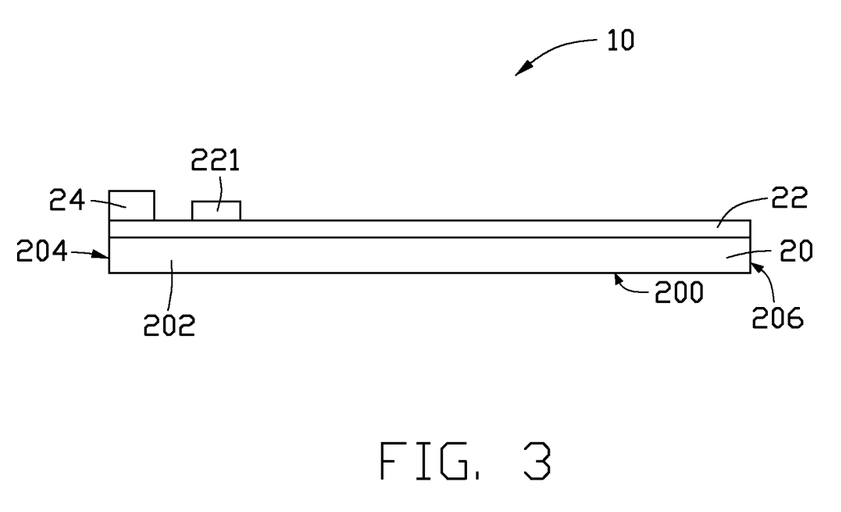
FIG. 3 is a top plan view of the display module utilized in the display device of FIG. 1, the display module including an orientation recognition unit.

Referring also to FIG. 3, the display module 10 includes a display panel 20, a circuit board 22, an orientation recognition unit 24, and a directional detection circuit 221. The display panel 20 includes a display surface 200, a first sidewall 202, a second sidewall 204, a third sidewall (not visible), and a fourth sidewall 206. The first sidewall 202, the second sidewall 204, the third sidewall and the fourth sidewall 206 are connected end to end in that order, and cooperatively define an area of the display surface 200, such area being perpendicular to the four sidewalls. The circuit board 22 is located on a surface of the display panel 20 opposite to the display surface 200. The orientation recognition unit 24 and the directional detection circuit 221 are located on a surface of the circuit board 22. The orientation recognition unit 24 determines an angle of rotation (i.e. orientation) of the display module 10, and generates a direction detection signal accordingly. The directional detection circuit 221 receives the direction detection signal, and directs the display panel 20 to display images in an orientation corresponding to the current angle of rotation.

Figure 4:
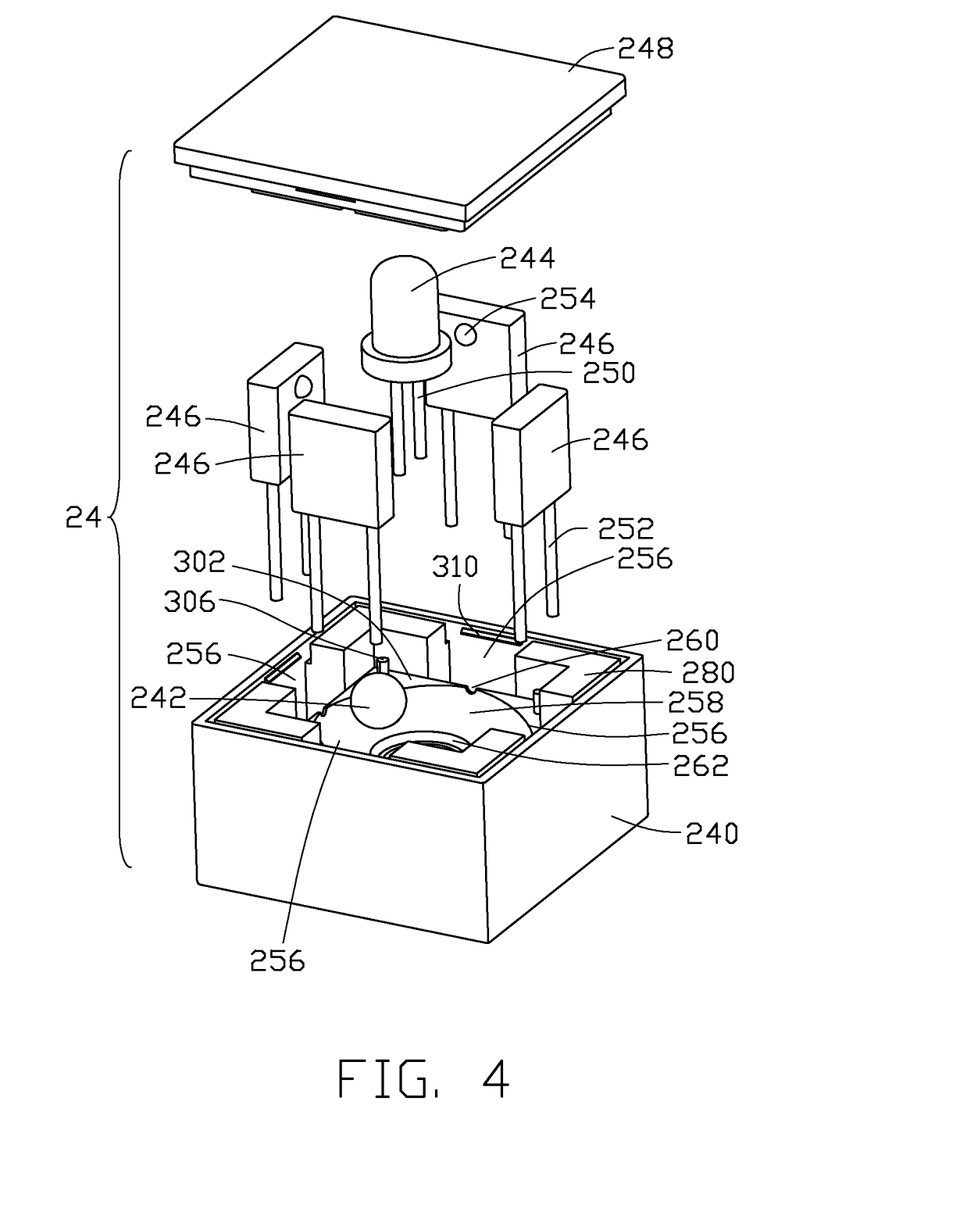
FIG. 4 is an enlarged, isometric, exploded view of the orientation recognition unit of FIG. 3, the orientation recognition unit including a main body and an upper cover.

Referring also to FIG. 4, the orientation recognition unit 24 includes a main body 240, a ball bearing 242, an optical emitter 244, four optical receivers 246, and an upper cover 248. The optical emitter 244 can, for example, be a light source 244. Each optical receiver 246 can, for example, be a photoelectric switch 246. The light source 244 includes two pins 250 connected to the circuit board 22. Each photoelectric switch 246 includes two pins 252 connected to the directional detection circuit 221 via the circuit board 22, and a light receiver 254. The light receiver 254 receives light from the light source 244. The main body 240 contains the ball bearing 242, the light source 244, and the four photoelectric switches 246 therein. The top of the main body 240 is enclosed by the upper cover 248. The upper cover 248 is parallel to the display surface 200, and can, for example, be highly insulative plastic. The ball bearing 242 can, for example, be copper alloy, ferrous alloy or another suitable metal.

The main body 240 includes a fifth sidewall (not labeled) coplanar with the first sidewall 202, a sixth sidewall (not labeled) coplanar with the second sidewall 204, a seventh sidewall (not labeled) opposite to the fifth sidewall, and an eighth sidewall (not labeled) opposite to the sixth sidewall. The fifth sidewall, the sixth sidewall, the seventh sidewall, and the eighth sidewall are connected end to end in that order. Thus, in the illustrated embodiment, the orientation recognition unit 24 is located on a corner of the circuit board 22 corresponding to the corner of the display panel 20 where the first sidewall 202 and the second sidewall 204 meet. In other embodiments, the orientation recognition unit 24 can be located at other positions of the circuit board 22, in any suitable desired orientation.

The main body 240 further includes four inside walls 280 corresponding to the fifth to eighth sidewalls respectively, with each inside wall 280 slightly lower than the corresponding sidewall. The four inside walls 280 cooperatively define a rectangular space. A receiving groove 256 is defined in the center of each inside wall 280, and four elongate bulges 310 corresponding to the receiving grooves 256 are respectively formed on inner surfaces of the fifth, sixth, seventh and eighth sidewalls.

Figure 5:
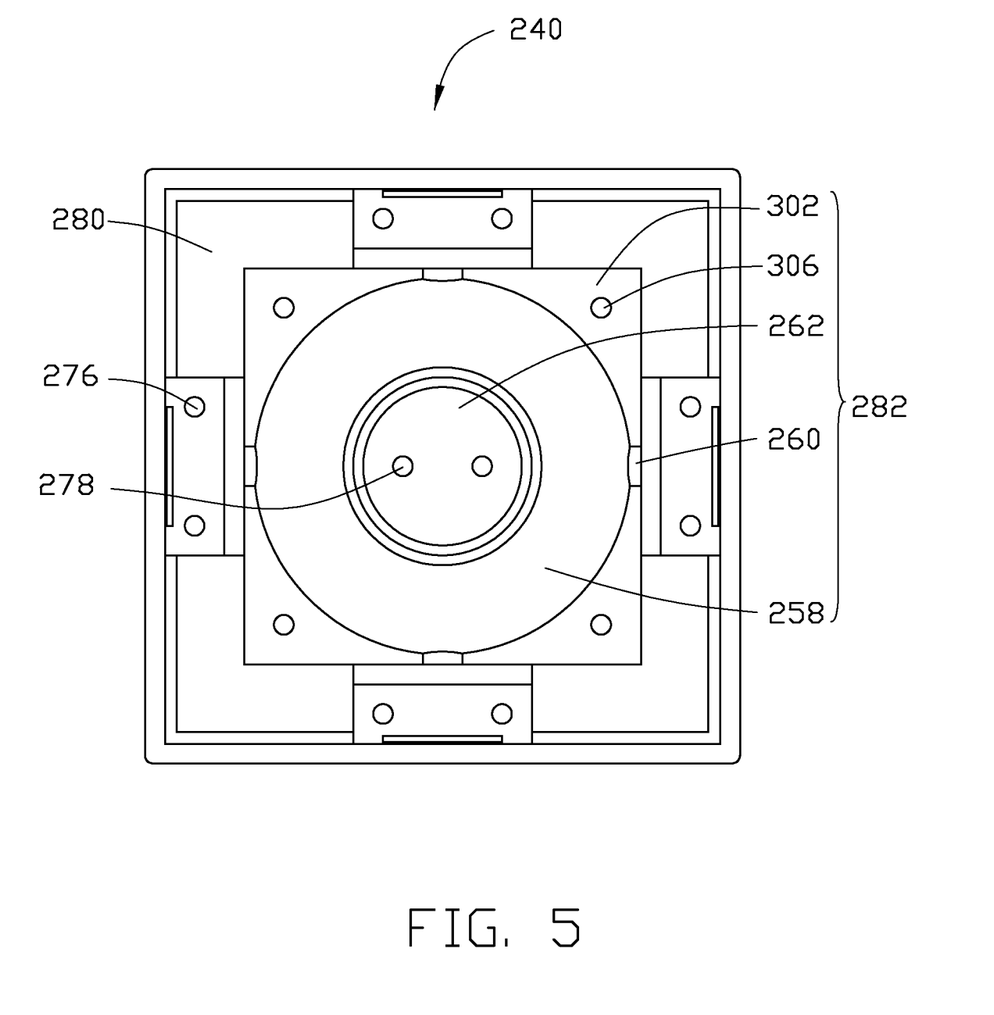
FIG. 5 is a top plan view of the main body of FIG. 4.

Referring also to FIG. 5, at a bottom of the main body 240, eight first through holes 276 corresponding to the pins 252 of the photoelectric switches 246 are defined, with each two first through holes 276 corresponding to one receiving groove 256. A first rectangular protrusion 282 corresponding to the rectangular space is formed at the bottom of the main body 240, with four sides of the first rectangular protrusion 282 adjoining inner surfaces of the inside walls 280, respectively. The first rectangular protrusion 282 includes a first concave structure 258, a peripheral area 302 surrounding the first concave structure 258, four cylindrical posts 306, four first semicircular grooves 260, and a first circular recess 262. The cylindrical posts 306 are located at four corners of the peripheral area 302, respectively. Portions of the peripheral area 302 corresponding to each receiving groove 256 define the four first semicircular grooves 260. Considered another way, these portions of the peripheral area 302 cooperate with corresponding portions of the first concave structure 258 to define the four first semicircular grooves 260. The first circular recess 262 is defined in a center of the first concave structure 258. Two second through holes 278 corresponding to the two pins 250 of the light source 244 are defined at the bottom of the main body 240, and communicate with the first circular recess 262. The second through holes 278 are disposed symmetrically opposite a center axis of the first circular recess 262. The main body 240 can, for example, be highly insulative plastic.

Figure 6:
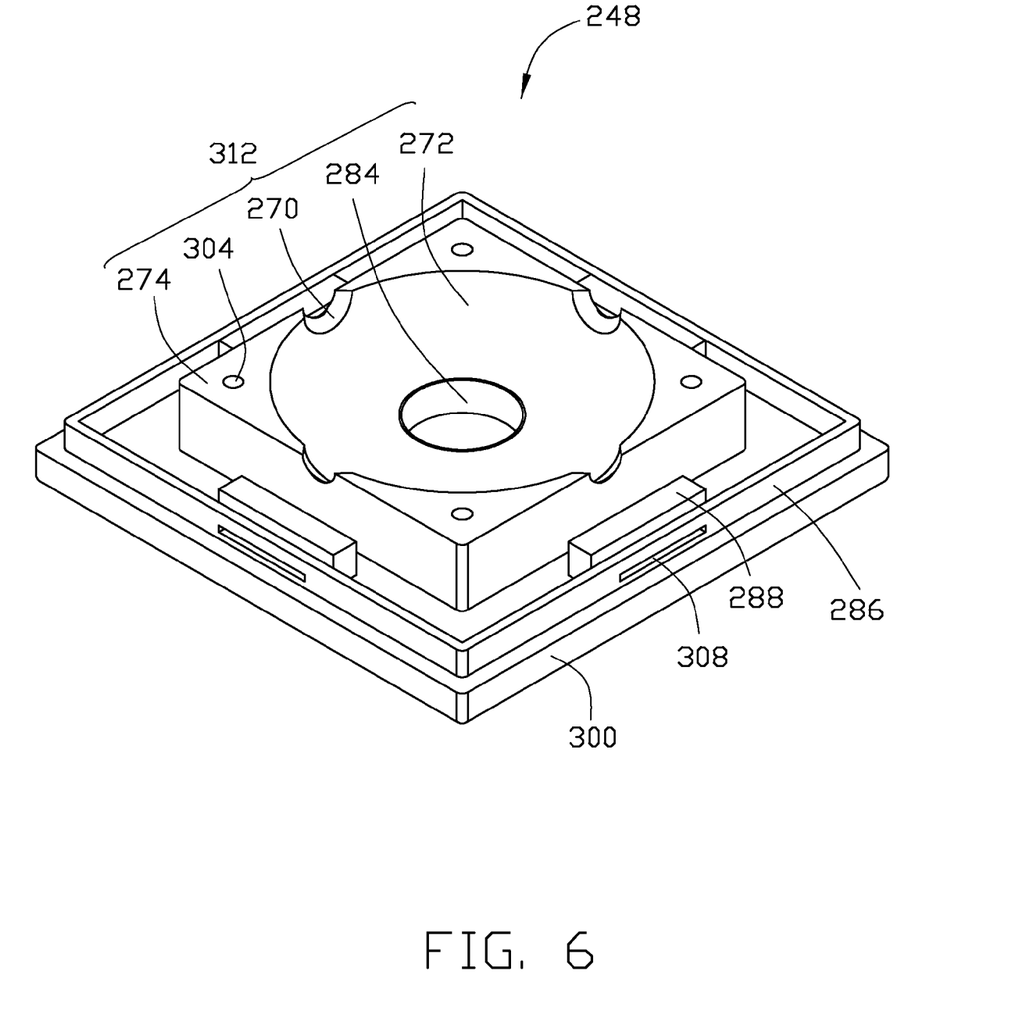
FIG. 6 is an isometric view of the upper cover of FIG. 4, showing the upper cover inverted.

Referring also to FIG. 6, the upper cover 248 includes a plate 300, a frame 286, four blocks 288, and a second rectangular protrusion 312. The frame 286, the four blocks 288 and the second rectangular protrusion 312 are located at an inner surface of the plate 300. The frame 286 is rectangular and hollow and located at a peripheral area of the upper cover 248, and corresponds to the tops of the inside walls 280. The second rectangular protrusion 312 is located at the middle of the upper cover 248, corresponding to the first rectangular protrusion 282. The blocks 288 are located between the frame 286 and the second rectangular protrusion 312, corresponding to the receiving grooves 256, respectively. In addition, corresponding to each block 288, the frame 286 defines four slits 308. The slits 308 cooperate with the elongate bulges 310 so that the upper cover 248 can snap-fit onto the main body 240. The second rectangular protrusion 312 includes a second concave structure 272, a peripheral area 274 surrounding the second concave structure 272, four cylindrical bores 304, four second semicircular grooves 270, and a second circular recess 284. The cylindrical bores 304 are located at four corners of the peripheral area 274, corresponding to the cylindrical posts 306, respectively. Portions of the peripheral area 274 corresponding to each block 288 define the four second semicircular grooves 270. Considered another way, these portions of the peripheral area 274 cooperate with corresponding portions of the second concave structure 272 to define the four second semicircular grooves 270. The second circular recess 284 is defined in a center of the second concave structure 272, and an upper extremity of the second circular recess 284 terminates at the inner surface of the plate 300.

Figure 7:
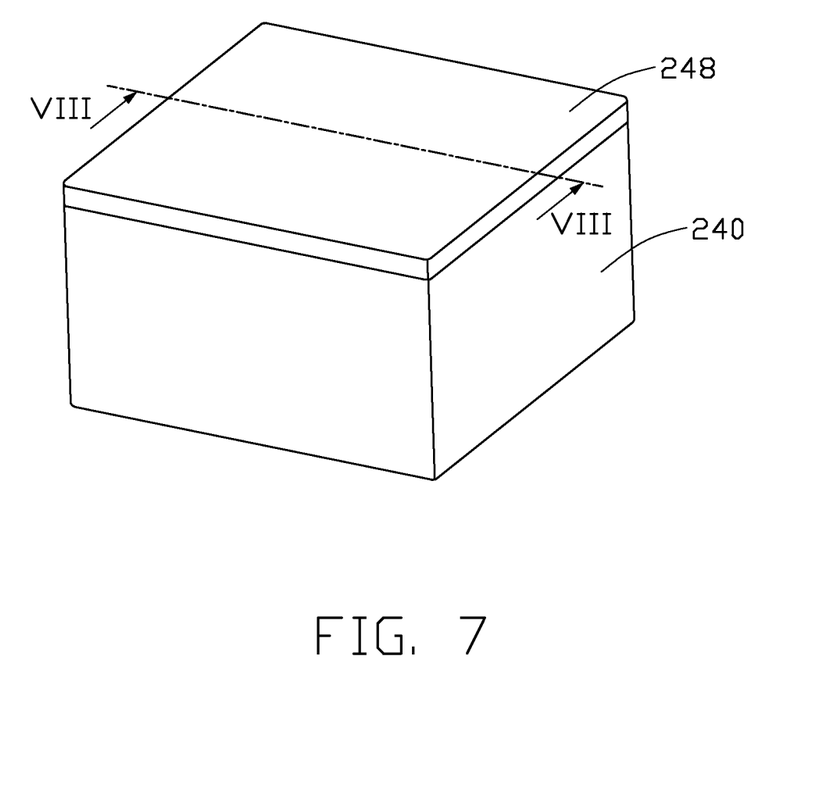
FIG. 7 is an assembled view of the orientation recognition unit of FIG. 4.
Figure 8:
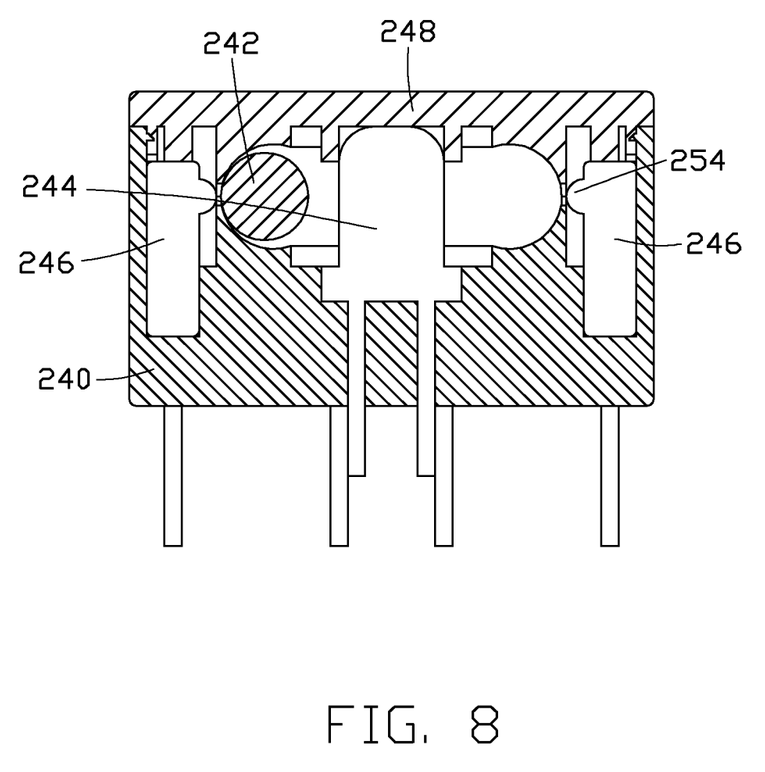
FIG. 8 is a cross-section of the orientation recognition unit of FIG. 7 taken along line VIII-VIII thereof.

An exemplary process of assembling the orientation recognition unit 24 is as follows. In step 1, the two pins 250 of the light source 244 are respectively inserted into the two second through holes 278, and the light source 244 is accordingly seated in the first circular recess 262. In step 2, the pins 252 of the photoelectric switches 246 are inserted into the first through holes 276, respectively, and the photoelectric switches 246 are accordingly seated in the receiving grooves 256, respectively. In step 3, the ball bearing 242 is disposed in the first concave structure 258. In step 4, referring also to FIGS. 7 and 8, the upper cover 248 is put on the top of the main body 240. Accordingly, the cylindrical posts 306 are inserted into the cylindrical bores 304, and the elongate bulges 310 are inserted into the slits 308, respectively. Thus, the blocks 288 respectively abut the tops of the photoelectric switches 246, and the top of the light source 244 is received in the second circular recess 284. In the illustrated embodiment, the blocks 288 respectively press the tops of the photoelectric switches 246. Accordingly, the main body 240 is securely enclosed by the upper cover 248. When the upper cover 248 and the main body 240 are securely attached together, the first concave structure 258 matches the second concave structure 272 well, thereby defining a generally annular orbit. A space defining the annular orbit is generally toroidal, and a transverse cross section of the first and second concave structures 258, 272 where they define the annular orbit is generally circular. Thus, the ball bearing 242 can roll along the annular orbit. In addition, the first semicircular grooves 260 match the second semicircular grooves 270, thereby defining four circular through holes. The circular through holes correspond to the four light receivers 254, respectively.

In one example of operation of the display device 1 as shown in FIG. 1, it is assumed that an initial aspect ratio of the display panel 20 is 16:9, for example. When the display panel 20 is in an initial state, the third sidewall is adjacent to a desktop. Accordingly, the ball bearing 242 is located at the seventh sidewall of the main body 240, blocking the circular through hole adjacent to the seventh sidewall. The photoelectric switch 246 located in the receiving groove 256 corresponding to the seventh sidewall does not detect any light from the light source 244, and correspondingly generates a first direction detection signal, which is transmitted to the directional detection circuit 221. The directional detection circuit 221 accordingly directs the display panel 20 to display the images in a landscape orientation according to the first direction detection signal, such that the aspect ratio of the images corresponds to that of the display panel 20 (i.e. 16:9).

When the display module 10 is rotated from the initial state 90° clockwise as viewed from the front of the display module 10 (FIG. 1), the fourth sidewall 206 is positioned adjacent to the desktop. The ball bearing 242 rolls along the annular orbit and stops on the eighth sidewall of the main body 240 because of the effect of gravity, blocking the circular through hole adjacent to the eighth sidewall. The photoelectric switch 246 located in the receiving groove 256 corresponding to the eighth sidewall does not detect any light from the light source 244, and correspondingly generates a second direction detection signal, which is transmitted to the directional detection circuit 221. The directional detection circuit 221 accordingly directs the display panel 20 to display the images in a portrait orientation according to the second direction detection signal, such that the aspect ratio of the images corresponds to that of the display panel 20 (i.e. 9:16).

When the display module 10 is rotated from the initial state 180° clockwise as viewed from the front of the display module 10 (FIG. 1), the first sidewall 204 is positioned adjacent to the desktop. The ball bearing 242 rolls along the annular orbit and stops on the fifth sidewall of the main body 240, blocking the circular through hole adjacent to the fifth sidewall. Thus the photoelectric switch 246 located in the receiving groove 256 corresponding to the fifth sidewall does not detect any light from the light source 244, and correspondingly generates a third direction detection signal, which is transmitted to the directional detection circuit 221. The directional detection circuit 221 accordingly directs the display panel 20 to display the images in a landscape orientation according to the third direction detection signal, such that the aspect ratio of the images corresponds to that of the display panel 20 (i.e. 16:9).

When the display module 10 is rotated from the initial state 270° clockwise as viewed from the front of the display module 10 (FIG. 1), the second sidewall 204 is positioned adjacent to the desktop. The ball bearing 242 rolls along the annular orbit and stops on the sixth sidewall of the main body 240, blocking the circular through hole adjacent to the sixth sidewall. Thus the photoelectric switch 246 located in the receiving groove 256 corresponding to the sixth sidewall does not detect any light from the light source 244, and correspondingly generates a fourth direction detection signal, which is transmitted to the directional detection circuit 221. The directional detection circuit 221 accordingly directs the display panel 20 to display the images in a portrait orientation according to the fourth direction detection signal, such that the aspect ratio of the images corresponds to that of the display panel 20 (i.e. 9:16).

The light source 244 maybe a light emitting diode. The photoelectric switches 246 maybe photoelectric triodes. In addition, the display module 10 can for example be rotated from the initial state 90°, 180°, and 270° counterclockwise, as viewed from the front of the display module 10 (FIG. 1). In such cases, the display module 10 operates in much the same way as that described above in relation to clockwise rotation of the display module 10.

As described above, the display device 1 includes the orientation recognition unit 24 and the directional detection circuit 221. When any of the photoelectric switches 246 of the orientation recognition unit 24 does not detect light from the light source 244, the photoelectric switch 246 generates a corresponding direction detection signal, which is transmitted to the directional detection circuit 221. The directional detection circuit 221 accordingly adjusts a display orientation of the images displayed by the display panel 20 according to the direction detection signal, such that the aspect ratio of the images corresponds to that of the display panel 20. Therefore, when adjusting of the aspect ratio of the images is desired, re-orientation of the images can be executed solely by the operation of rotating the display module 10 of the display device 1 to a desired orientation. No separate manual input, such as via a keyboard or a mouse, is required for the re-orientation of the images. This means the task of adjusting of aspect ratio of the images is easy and convenient for a user.

Figure 9:
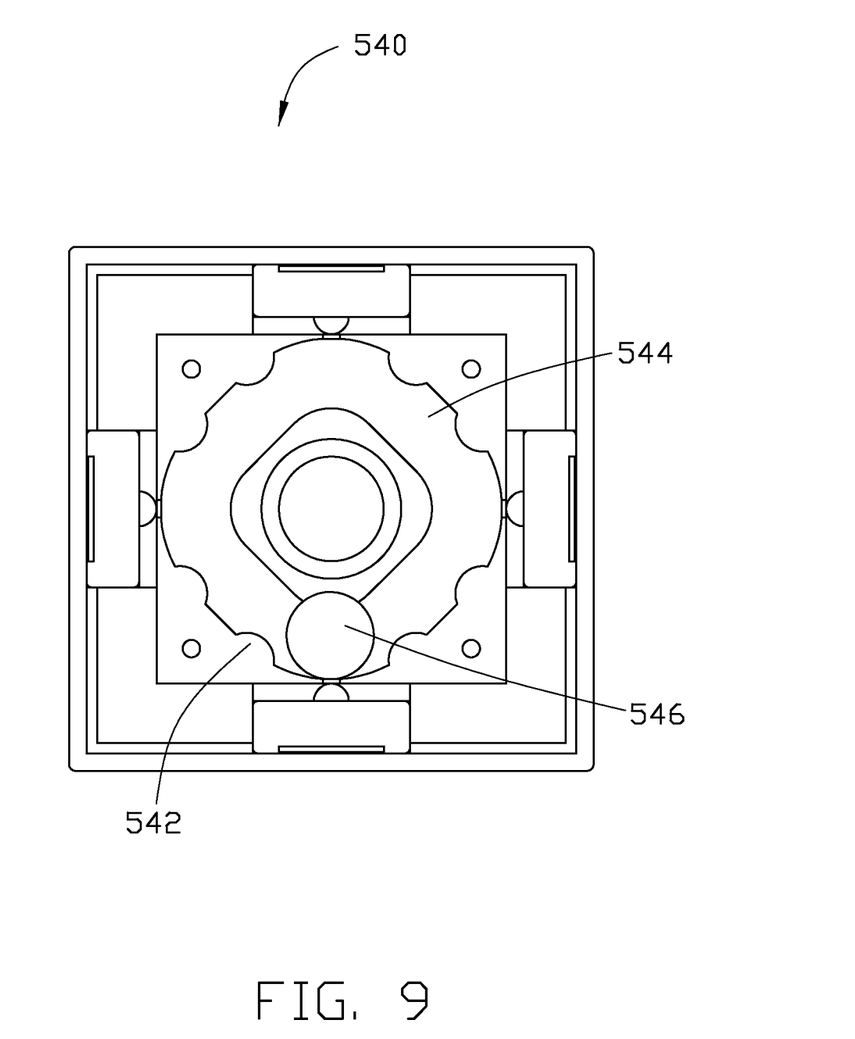
FIG. 9 is a top plan view of a main body of an orientation recognition unit of a second embodiment of a display device of the present disclosure.

Referring to FIG. 9, a second embodiment of a display device (not shown) of the present disclosure includes a display module (not shown) having an orientation recognition unit. The orientation recognition unit of the second embodiment differs from the orientation recognition unit 24 of the previous embodiment only in the inclusion of a plurality of bumps 542 distributed on inner surfaces of a first concave structure 544 of a main body 540, and a plurality of bumps (not shown) distributed on inner surfaces of a second concave structure (not shown) located in an upper cover (not shown) of the orientation recognition unit. Thus, when the display module of the display device stops rotating at a point where any one of sidewalls of a display panel (not shown) is positioned adjacent to a desktop, a ball bearing 546 of the orientation recognition unit stops at a corresponding sidewall of the main body 540 promptly due to baffling action of the corresponding bumps 542.

It should be pointed out that in alternative embodiments, the light source 244 can be replaced by any one of other suitable kinds of optical emitters such as an infrared emitter. Correspondingly, each photoelectric switch 246 is replaced by another kind of optical receiver such as an infrared receiver. In addition, the display device 1 can instead be a wall-mounted (or cantilever-mounted) display device.

It is believed that the present embodiments and their advantages will be understood from the foregoing description, and it will be apparent that various changes may be made thereto without departing from the spirit and scope of the embodiments or sacrificing all of their material advantages.

What is claimed is:
1. A display device, comprising:
a display panel for displaying images;
an orientation recognition unit configured for determining an angle of rotation of the display panel and generating a corresponding direction detection signal, comprising:
a housing defining an orbit;
an optical emitter;
a main body comprising a first concave structure with a first recess;
an upper cover comprising a second concave structure with a second recess, wherein the main body is connected to the upper cover such that the optical emitter is received in the first and second recesses, and the orbit thereby cooperatively defined by the first and second concave structures;
a ball bearing movably received in the orbit;
four optical receivers;
four receiving grooves defined at four inside walls of the orientation recognition unit respectively, with the four optical receivers received in the four receiving grooves respectively;
at least one through hole corresponding to the four optical receivers, wherein the at least one through hole communicates with the orbit; and
a plurality of bumps distributed on a peripheral surface of the orbit corresponding to the at least one through hole;
wherein when the display panel is rotated to a predetermined angle, the ball bearing moves under the effect of gravity to stop on at least one through hole where the ball bearing blocks transmission of light between the optical emitter and a first optical receiver of the four optical receivers, the orientation recognition unit generates a corresponding direction detection signal; and the bumps are positioned to quickly baffle the ball bearing to the position where the ball bearing blocks the transmission of light between the optical emitter and the first receiver; and
a directional detection circuit configured for adjusting an orientation of one or more images displayed by the display panel according to the direction detection signal.

2. The display device of claim 1, wherein the at least one optical receiver is one of at least one photoelectric switch and at least one infrared receiver, and the optical emitter is one of a light source and an infrared emitter corresponding to the at least one photoelectric switch or the at least one infrared receiver, respectively.

3. The display device of claim 1, wherein the display device is one of a desktop display device, a wall-mounted display device, and a cantilever-mounted display device.

4. A display device, comprising:
a display module;
a stand; and
a hinge connecting the stand with the display module; the display module comprising:
a display panel for displaying images;
an orientation recognition unit configured for determining an angle of rotation of the display panel on the hinge and generating a corresponding direction detection signal, comprising:

a housing defining an orbit;
an optical emitter;
a main body comprising a first concave structure with a first recess;
an upper cover comprising a second concave structure with a second recess, wherein the main body is connected to the upper cover such that the optical emitter is received in the first and second recesses, and the orbit thereby cooperatively defined by the first and second concave structures;
a ball bearing movably received in the orbit;
four optical receivers;
four receiving grooves defined at four inside walls of the orientation recognition unit respectively, with the four optical receivers received in the four receiving grooves respectively;
at least one through hole corresponding to the four optical receivers, wherein the at least one through hole communicates with the orbit; and
a plurality of bumps distributed on a peripheral surface of the orbit corresponding to the at least one through hole;
wherein when the display panel is rotated to a predetermined angle, the ball bearing moves under the effect of gravity to stop on at least one through hole where the ball bearing blocks transmission of light between the optical emitter and a first optical receiver of the four optical receivers, the orientation recognition unit generates a corresponding direction detection signal; and the bumps are positioned to quickly baffle the ball bearing to the position where the ball bearing blocks the transmission of light between the optical emitter and the first receiver; and
a directional detection circuit configured for adjusting an orientation of one or more images displayed by the display panel according to the direction detection signal.

5. The display device of claim 4, wherein the at least one optical receiver is one of at least one photoelectric switch and at least one infrared receiver, and the optical emitter is one of a light source and an infrared emitter corresponding to the at least one photoelectric switch or the at least one infrared receiver, respectively.

6. The display device of claim 4, wherein the display device is one of a desktop display device, a wall-mounted display device, and a cantilever-mounted display device.

* * * * *